July 18, 1967 R. G. HOFFERT 3,331,307
ROTISSERIE WITH ROLLERS FOR SUPPORTING SAUSAGES
Filed Nov. 16, 1965
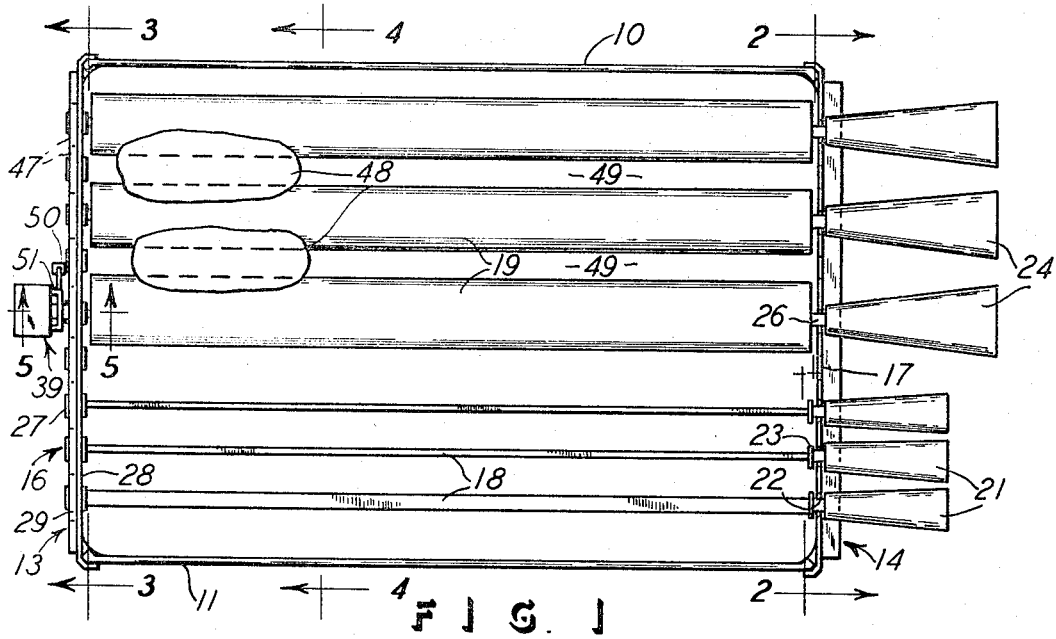
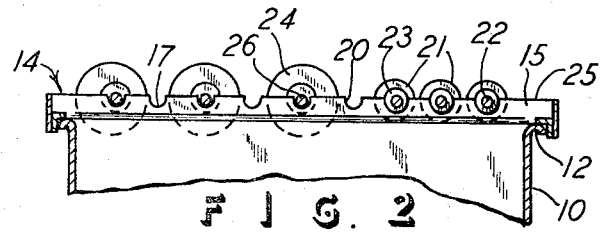
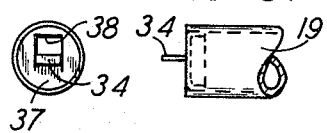
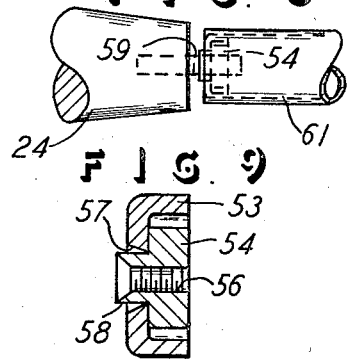
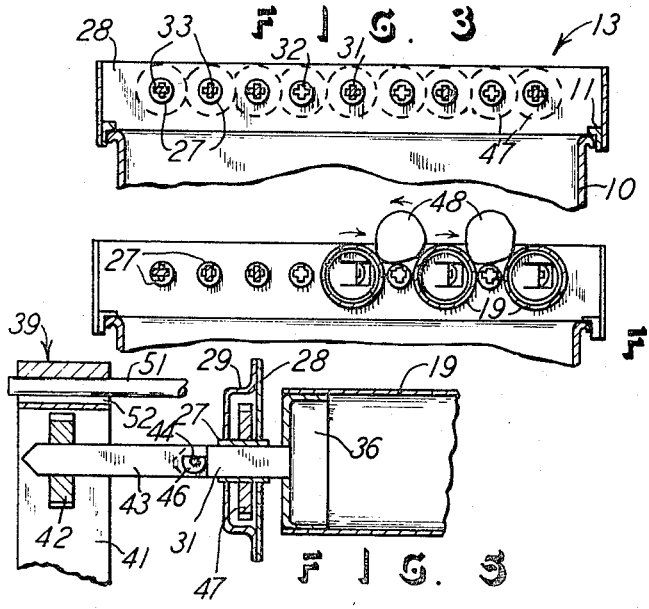
INVENTOR:
ROY G. HOFFERT
BY: Arthur J. Hanemann
ATTORNEY

United States Patent Office 3,331,307
Patented July 18, 1967

3,331,307
ROTISSERIE WITH ROLLERS FOR SUPPORTING SAUSAGES
Roy George Hoffert, 423 Melvin Ave., Racine, Wis. 53402
Filed Nov. 16, 1965, Ser. No. 508,100
3 Claims. (Cl. 99—339)

ABSTRACT OF THE DISCLOSURE

A rotisserie having spaced-apart support portions with means thereon for receiving both skewers and rollers. One of the support portions has rotatable drive means thereon for engaging one end of the skewers and rollers to thereby rotate the skewers and rollers. The drive means are spaced-apart, and the rollers are of a diameter, so that the rollers may be engaged with every other one of the drive means or sockets therein and yet have the rollers spaced-apart a distance adequate for supporting the sausage between the rollers.

---

This invention relates to a rotisserie with rollers for supporting sausages.

Rotisseries for outdoor cooking, or any other form of cooking, are generally employed and commonly known today. These are arranged to be electrically operated both for powering the movable parts, such as skewers which support the food, and for supplying the heat for cooking the food. Where skewers or other means are employed for supporting the food above the source of heat, the supports are generally arranged so that they can be either placed adjacent the heat source or removed therefrom in relatively simple and safe maneuvers. That is, skewers, generally are arranged to be inserted into rotatably driven sockets at one end of the skewer, and the other end of the skewer may simply be laid over a bearing or support surface so that the skewer can be slowly rotated in the process of cooking the food which is pierced by the skewer.

It is a general object of this invention to provide a rotisserie with rollers which support the food above the source of heat, and preferably the rotisserie and rollers specifically are arranged to support sausages or like tubularly shaped items of food and to slowly rotate the sausages in the cooking process.

Another object of this invention is to provide a rotisserie which permits the user to selectively use it as either a skewer type or a roller type, or, in fact, it may be used at one time as a combination of both types.

Other objects of this invention include the provision of a rotisserie convertible between a skewer type and a roller type and wherein the rollers are efficient in their action of supporting and rotating sausages or the like, and they do so in a manner which does not permit the sausages to fall off the rollers. Still further, the rotisserie is provided in an inexpensive but yet efficient and reliable construction of rollers interchangeable with skewers used in the rotisserie. This objective of providing an inexpensive roller type rotisserie is significant in that it is accomplished without requiring any alteration in a basic rotisserie unit arranged for supporting skewers, the rollers may be readily made of variable lengths to accommodate a particular length of rotisserie having particular lengths of skewers, and the rollers may be made from tubing with special end caps for rotatably supporting them.

Other objects and advantages become apparent upon reading the following description in light of the accompanying drawings, wherein:

FIG. 1 is a top plan view of a rotisserie showing a preferred embodiment of this invention.

FIG. 2 is a sectional view taken along the irregular line 2—2 of FIG. 1.

FIG. 3 is a sectional view taken along the straight line 3—3 of FIG. 1.

FIG. 4 is a sectional view taken along the straight line 4—4 of FIG. 1.

FIG. 5 is an enlarged sectional view taken along the line 5—5 of FIG. 1.

FIG. 6 is an end elevational view of a roller.

FIG. 7 is a side elevational view of FIG. 6.

FIG. 8 is a side elevational view of a fragment of a roller and its handle.

FIG. 9 is an enlarged sectional view through the end cap of a roller and its supported internal nut, with the showing being prior to the final manufacture of the piece.

The rotisserie is shown to include the base element or pan 10 which is generally rectangularly shaped in plan view. The pan 10 extends downwardly, as fragmentarily shown in FIGS. 2, 3, and 4, and it would of course be understood that a source of heat, preferably an electric heating coil (not shown) would be employed in the pan 10 for cooking purposes in the well-known manner. A frame piece 11, which is a support member as hereinafter is made apparent, is removably supported on the pan 10 and is made of a rectangular shape similar to the pan 10 to fit over the upper edge 12 of the pan 10. The support member 11 has two spaced-apart portions 13 and 14. These portions 13 and 14 respectively contain rotatable drive means 16 and rotation bearings or bearing surfaces 17. Thus it will be apparent and understood that skewers 18 and rollers 19 extend between the portions 13 and 14 and are rotatably supported on the portions by the members 16 and 17.

The support member portion 14 is shown in FIG. 2 to include a panel or uprightly disposed planar piece 15 which has a plurality of notches 20 along the upper edge 25. The notches 20 actually provide the means for receiving the skewers 18 and the rollers 19 in a rotatable fashion. The skewers 18 have handles 21 which are disposed beyond the panel piece 15 and the skewers have shafts 22 which are nested in and rotatably received in the notches 20 for the rotatable support of the skewers 18. A flange 23 is provided on the skewers 18 to limit axial movement of the skewers with respect to the panel 15.

Similarly, the rollers 19 have handles 24 which are disposed beyond the panel 15, and the rollers have shafts 26 which are rotatably received in the notches 20 and are thus presented to the rotatable bearings or bearing surfaces 17, as are the skewer shafts 22. In this manner, the rollers 19 are also rotatably supported by the panel 15.

The other ends of the skewers 18 and rollers 19 are supported on the portion 16 in drive sockets 27 which are rotatably mounted on a panel piece 28 and a supporting sheet 29, as shown in FIG. 5. The sockets 27 are spaced along the pieces 28 and 29, to align with the notches 20 in the piece 15. The adjacent ends of the skewers 18 and rollers 19 are drivingly received in the sockets 27 so that the skewers 18 and the rollers 19 rotate along with and in response to the rotation of the sockets 27. Thus FIG. 5 shows the center roller 19 and its projected end 31 disposed within the socket 27 which is arranged with a cruciform opening 32 extending through the socket 27, and in the shape shown in FIGS. 3 and 4. Thus FIG. 3 shows the roller end 31 received in the opening in the central socket 27, and it also shows the skewer ends 33 received in the openings 32 in their respective sockets 27. These ends 31 and 33 are readily insertable and retractable with respect to the socket 27 so that one can readily place and remove the skewers 18 and the rollers 19 with respect to the support member 11.

Actually, the center roller 19 which is shown in FIG. 5 has a special end 31 for purposes of connecting to the rotatable drive means described later. The other or side rollers 19 have shorter ends 34 as shown in FIGS. 6 and 7. In both showings, the ends 31 and 34 are supported on end caps 36 and 37 respectively in the FIG. 5 and FIG. 6 showings. It is significant that the ends 34 are arranged on the end caps 37 by means of being punched out of the caps 37 to leave openings 38 which show the punch-out of the ends 34. Thus the end caps 37 can be very inexpensively provided and can then be inserted into standard tubing which forms the roller 19.

The roller ends 31 are made special for connecting to an electric motor 39 which rotatably drives skewers 18 and rollers 19. FIG. 5 shows the motor casing 41 to enclose a gear 42 which is suitably rotatably mounted in the casing 41. A driven arm 43 extends from the casing 41 and is attached to the roller end 31 by means of a pin 44 and a removable snap ring 46. Thus, in any conventional manner, the motor driven arm 43 is connected to the roller drive arm 31 so that the latter may be rotated and the socket 27 will also be rotated. A gear 47 is affixed to the socket 27 to rotate therewith, and the gear 47 is one of a train of gears disposed along the support pieces 28 and 29 with one gear on each socket 27 to rotate the socket 27. Thus all of the gears 47 and the sockets 27 rotate in the manner of a continuous gear train so that each gear rotates in a direction opposite to its adjacent gear which is in mesh with it. However, as shown in FIGS. 1 through 4, the rollers 19 are disposed in every other socket 27, and thus the rollers 19 will all rotate in the same direction since every other gear 47 will be rotating in the same direction. With this arrangement, tubularly shaped food items which are commonly referred to as sausages, and are designated 48 as shown in FIGS. 1 and 4, are supported on the rollers 19 to be slowly rotated and of course to be disposed above the space between adjacent rollers 19, as shown. The sausages are therefore subjected to heat and are slowly turned to be uniformly cooked. The feature of rotating the rollers 19 in the same direction, such as all clockwise in FIG. 4. Since the roller on the left in FIG. 4 is then moving its contact surface downwardly at the point of support of the sausage 48, the roller in the middle position in FIG. 4 is moving its contact surface upwardly, and this cooperation between the rollers prevents the sausage from falling out from between the rollers. The sausage therefore cannot cling or stick to either roller and be carried out of the space between two adjacent rollers.

The diameters of the rollers 19 are shown to be greater than the space designated 49 between the rollers 19. This relationship permits the conversion of a skewer type rotisserie to a roller type rotisserie for the suitable support of the sausages 48 and the secured rotational action described. Of course the skewers 18 may be placed in adjacent sockets 27 since the direction of rotation of the skewers is not significant in the support and cooking of the food which may be placed on the skewers.

The motor 39 may be supported on the rotisserie by means of a bracket 51 extending into an opening 52 in the motor housing 41 and with the bracket 51 being supported on a block 50 attached to the rotisserie pan 10 in any suitable manner. Thus the motor 39 can be readily removed from the remainder of the rotisserie as it slips off the bracket 51 and away from the roller end 31 after detachment of the snap ring 46 or the arm 43 can slide out of the motor gear 42, both in any conventional manner.

FIGS. 8 and 9 show an inexpensive and practical way of securing the roller handles 24 to the roller tubular or body portions. FIG. 9 shows the assembly of a cap 53 and a central nut or plug 54 having a threaded opening 56. The cap 53 is formed with a tapered opening 57, and the nut 54 is formed with a tapered projection 58. A conventional means of swaging or forcing the projection 58 into the tapered circular opening 57 will secure the nut 54 to the cap 53. The latter may then be pressed into the tubing of the roller 19 for final assembly. Of course the handle 24 will then have a threaded stud 59 provided thereon for screwing into the nut threaded opening 56. Thus the roller tube 61 and the handle 24 are spaced apart for rotatable mounting on the panel 15 as mentioned.

While a specific embodiment of this invention has been shown and described, it should be obvious that certain changes could be made in the embodiment and the invention should therefore be determined only by the scope of the appended claims.

What is claimed is:

1. A rotisserie convertible between a skewer type and roller type, comprising a support member including spaced-apart portions, a plurality of rotatable drive members spaced along one of said portions and rotation support surfaces spaced along the other of said portions and aligned with said drive members, each of said drive members having a drive socket therein axially aligned to be directed toward said rotation support surfaces, skewers and rollers of a length extending between said portions and having projections identically shaped in cross section on one end of both said skewers and said rollers to be interchangeably insertable into said drive sockets for rotatable drive engagement with said drive members, circular portions on the other end of both said skewers and said rollers for rotatable support on said rotation support surfaces, the diameters of said rollers and the spacing of said drive sockets being adapted to have said rollers disposed on said support member with adjacent ones of said rollers spaced apart a distance less than the diameters of said rollers, handles attached to said skewers and said rollers to be disposed at said other ends for placement of said skewers and said rollers into and out of said sockets, and a rotation driver connected to said rotatable drive members for powering the latter.

2. The subject matter of claim 1 with each of said rollers including an end cap affixed on said one end, integral material of said end cap presenting said projection on said one end of said roller, and said drive means having a socket for snugly receiving said projection to rotate said roller.

3. The subject matter of claim 1 with said drive members being a train of gears with every other gear rotatable in the same direction, and with said diameters of said rollers being larger than the diameters of said gears and with adjacent ones of said rollers being positioned in every other one of said sockets to have said rollers rotatably drivingly connected with said every other gear for rotation of said rollers in the same direction.

References Cited

UNITED STATES PATENTS

| 694,889 | 3/1902 | Pooley | 99—421 XR |
| 2,185,979 | 1/1940 | Dumas | 99—423 |
| 2,577,963 | 12/1951 | Hagopian | 99—421 XR |
| 2,604,842 | 7/1952 | Dolce | 99—423 |
| 3,084,616 | 4/1963 | Nissen et al. | 99—423 |

FOREIGN PATENTS 203,394   6/1939   Switzerland.

WALTER A. SCHEEL, *Primary Examiner.*

A. HENDERSON, *Assistant Examiner.*